United States Patent
Madasamy et al.

(10) Patent No.: US 10,559,795 B1
(45) Date of Patent: Feb. 11, 2020

(54) CHASSIS BRACE FOR PROTECTING TRACTION BATTERY

(71) Applicant: Ford Global Technologies, LLC, Dearborn, MI (US)

(72) Inventors: Chelliah Madasamy, Canton, MI (US); Joseph David Hyde, Flint, MI (US); Matthew B. Makowski, Northville, MI (US); Echung Su, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/225,739

(22) Filed: Dec. 19, 2018

(51) Int. Cl.
| | | |
|---|---|---|
| *B60L 50/00* | (2019.01) | |
| *H01M 2/10* | (2006.01) | |
| *B60L 50/64* | (2019.01) | |
| *H01M 10/625* | (2014.01) | |
| *B60K 1/04* | (2019.01) | |
| *B60L 50/60* | (2019.01) | |

(52) U.S. Cl.
CPC ............. *H01M 2/1083* (2013.01); *B60K 1/04* (2013.01); *B60L 50/64* (2019.02); *H01M 10/625* (2015.04); *B60K 2001/0438* (2013.01); *B60L 50/66* (2019.02)

(58) Field of Classification Search
CPC ...... B60K 1/04; H01M 2/1083; H01M 10/625
See application file for complete search history.

(56) References Cited

U.S. PATENT DOCUMENTS

| | | | | |
|---|---|---|---|---|
| 8,585,132 | B2* | 11/2013 | Klimek | B60K 1/04 |
| | | | | 296/187.08 |
| 8,602,454 | B1* | 12/2013 | Baccouche | B60K 1/04 |
| | | | | 180/68.5 |
| 9,073,578 | B2* | 7/2015 | Chikazawa | B62D 21/155 |
| 9,776,671 | B2* | 10/2017 | Song | B62D 25/04 |
| 9,937,781 | B1 | 4/2018 | Bryer et al. | |
| 2002/0057004 | A1* | 5/2002 | Corcoran | B62D 21/02 |
| | | | | 296/203.01 |
| 2011/0297467 | A1* | 12/2011 | Iwasa | B60K 1/04 |
| | | | | 180/65.31 |
| 2013/0008735 | A1* | 1/2013 | Hiramatsu | B60K 17/16 |
| | | | | 180/291 |
| 2013/0285416 | A1* | 10/2013 | Fukushi | B62D 21/11 |
| | | | | 296/204 |
| 2014/0338999 | A1* | 11/2014 | Fujii | B60K 1/04 |
| | | | | 180/68.5 |
| 2015/0061272 | A1* | 3/2015 | Watanabe | B62D 21/11 |
| | | | | 280/784 |
| 2017/0008565 | A1* | 1/2017 | Murata | B62D 21/11 |
| 2017/0113723 | A1* | 4/2017 | Murata | B62D 21/11 |
| 2017/0313170 | A1* | 11/2017 | Hara | B60K 1/04 |
| 2018/0105213 | A1* | 4/2018 | Kagami | B62D 21/155 |
| 2018/0148100 | A1* | 5/2018 | Nakagawa | B62D 21/155 |
| 2018/0194212 | A1* | 7/2018 | Hamilton | B60K 1/04 |

\* cited by examiner

*Primary Examiner* — Hau V Phan
(74) *Attorney, Agent, or Firm* — David Kelley; Brooks Kushman, P.C.

(57) ABSTRACT

A vehicle includes a battery pack having siderails and includes a front cradle having rearwardly extending arms connected to the siderails and a cross member longitudinally spaced from the battery pack. A brace has a midportion connected to the cross member and ends connected to the arms such that the brace creates load paths between the cross member and the siderails to inhibit impact between the cross member and the battery pack.

20 Claims, 3 Drawing Sheets

US 10,559,795 B1

CHASSIS BRACE FOR PROTECTING TRACTION BATTERY

TECHNICAL FIELD

This disclosure relates to a chassis brace for routing collision energy from a front cradle to rockers to protect a traction battery during a front impact.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high-voltage components, and may include an air or liquid thermal-management system to control the temperature of the battery.

SUMMARY

According to one embodiment, a vehicle includes a battery pack having siderails and includes a front cradle having rearwardly extending arms connected to the siderails and a cross member longitudinally spaced from the battery pack. A brace has a midportion connected to the cross member and ends connected to the arms such that the brace creates load paths between the cross member and the siderails to inhibit impact between the cross member and the battery pack.

According to another embodiment, a vehicle includes a chassis having spaced apart longitudinal rockers. A front cradle of the vehicle has a cross member and arms extending rearwardly and outwardly from the cross member. Each of the arms are connected to the chassis. A battery pack is supported to the chassis between the rockers. The battery pack includes a support structure having a tray, a front wall, and opposing siderails connected to the rockers. Battery cells are supported on the tray and are disposed between the siderails and behind the front wall. A brace includes a midportion connected to the cross member and ends connected to the chassis. The brace is longitudinally spaced from the front wall so that the brace and the front wall are not attached. The brace creates load paths between the cross member and the chassis. The load paths route collision energy around the battery pack and inhibit impact between the cross member and the front wall.

According to yet another embodiment, a vehicle includes rockers and a battery pack supported between the rockers. A front cradle has arms connected to the rockers and a cross member longitudinally spaced from the battery pack. An arched brace has a midportion attached to the cross member and ends connected to the rockers such that the brace creates load paths between the cross member and the rockers to route energy around the battery pack mitigating damage during a collision.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
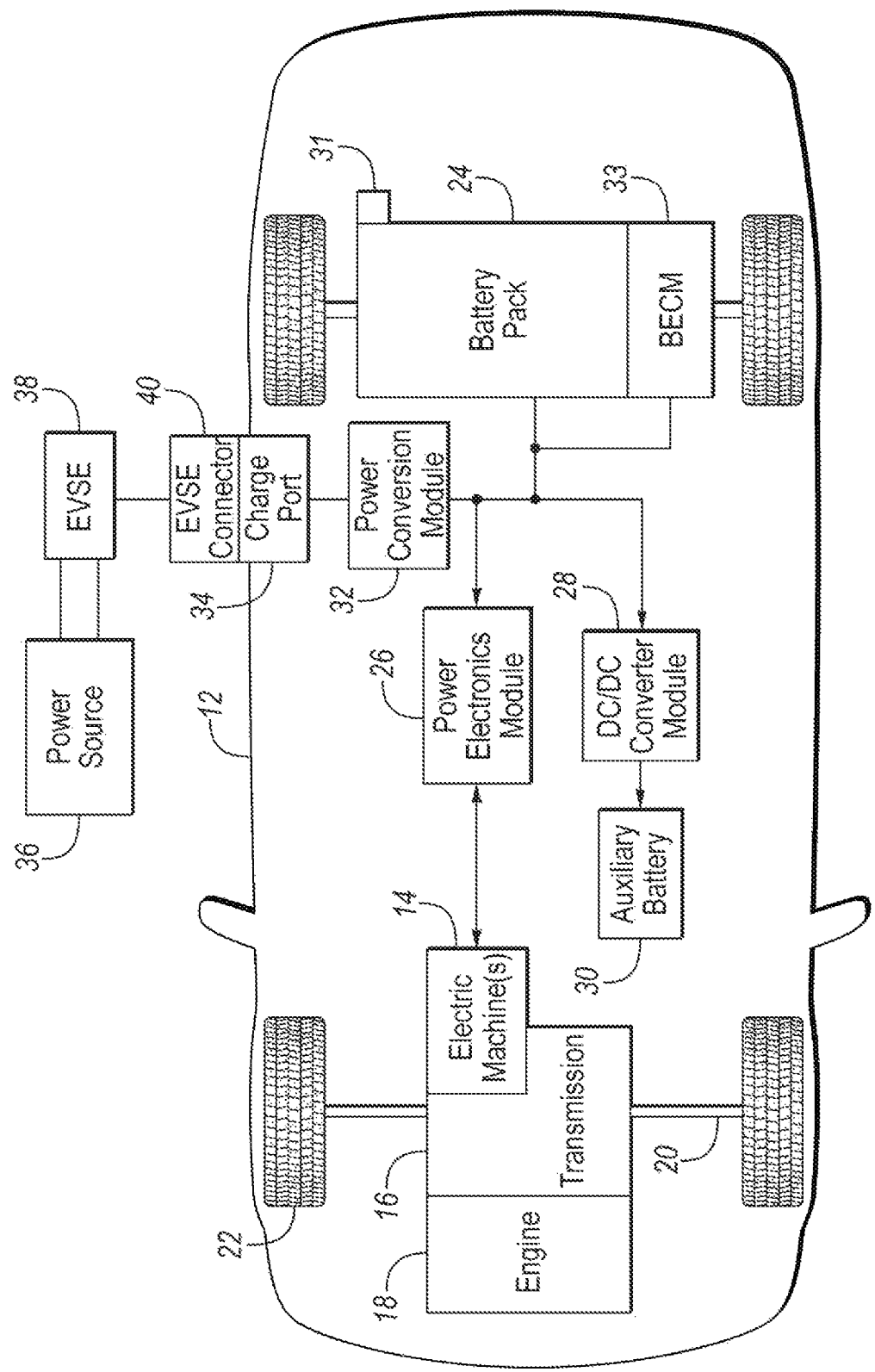
FIG. 1 is a schematic diagram of a hybrid vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include air-cooling systems, liquid-cooling systems and a combination of air-and-liquid systems.

The battery pack 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully electric vehicle. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
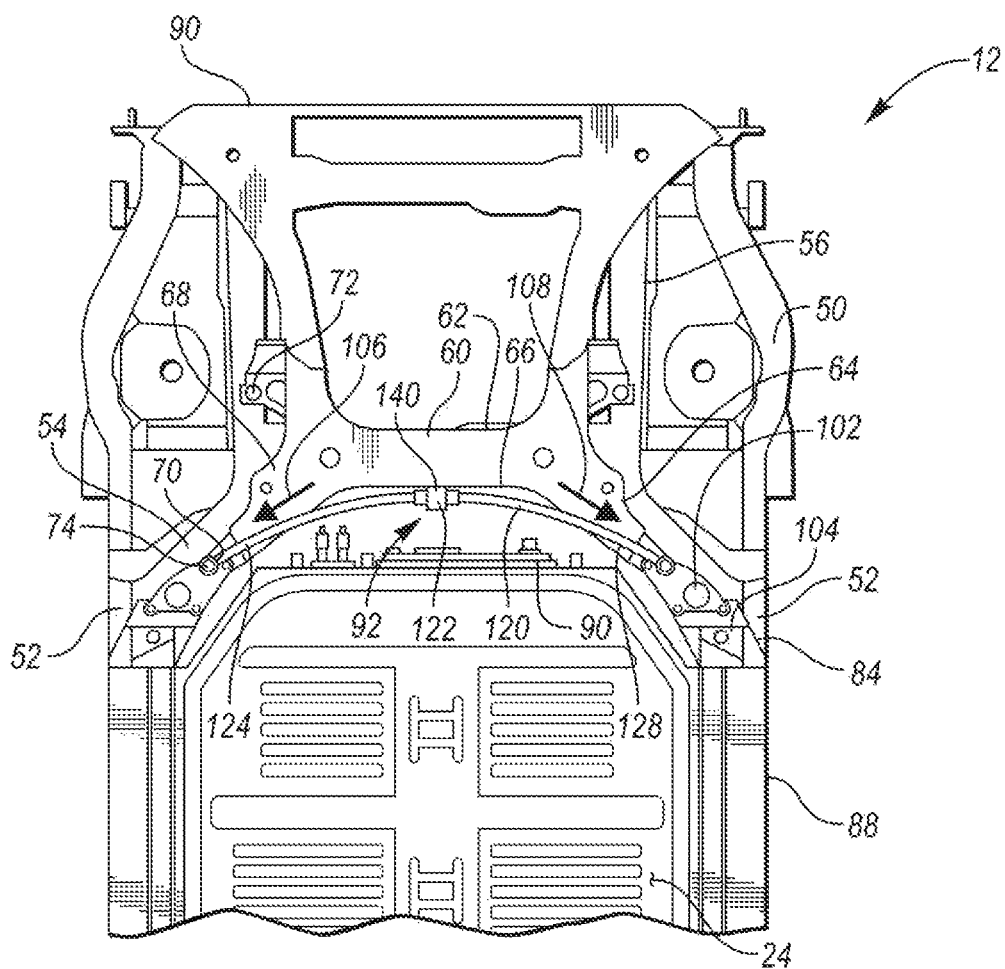
FIG. 2 is a bottom view of a vehicle chassis and a battery pack of the vehicle.
Figure 3:
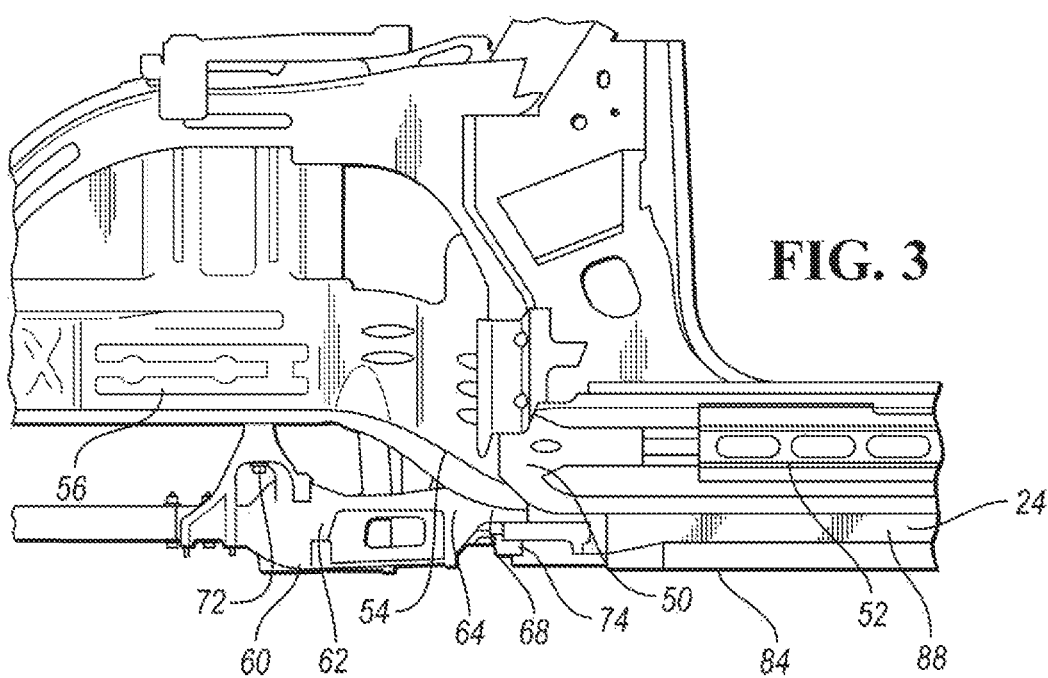
FIG. 3 is a side view of the vehicle chassis and the battery pack.

Referring to FIGS. 2 and 3, the vehicle 12 includes a chassis 50 having a pair of longitudinally extending rockers 52 that are spaced apart and generally extend along the outer sides of the vehicle 12 near the bottom of the door openings. The chassis 50 also includes a pair of spaced apart front rails 56 generally located under the front hood area of the vehicle 12. The front rails 56 are more narrowly spaced that the rockers 52 and consequently are inboard of the rockers 52. The front rails 56 are connected to the rockers 52 by S-rails 54 that flair outwardly.

A front cradle 60 is disposed in the front hood area and is connected to the chassis 50 either directly by fasteners, welding, or the like or indirectly via one or more intermediary components, e.g., brackets or the like. For example, fasteners 72 may attach the front cradle 60 to the front rails 56. The front cradle 60 may include a cross member 62 extending laterally across the vehicle 12 and arms 64 extending rearwardly and outwardly from a rear side 66 of the cross member 62. The arms 64 are sometimes referred to as frog legs. Each of the arms 64 includes a first end 68 that is joined to the cross member 62 and a second end 70 connected to the S-rails by fasteners 74. The front cradle 60 may be an integrally formed piece. According to one embodiment, the front cradle 60 is cast aluminum in which the cross member 62, or multiple joined pieces, the arms 64, and potentially other illustrated portions of the front cradle are integrally formed.

Figure 4:
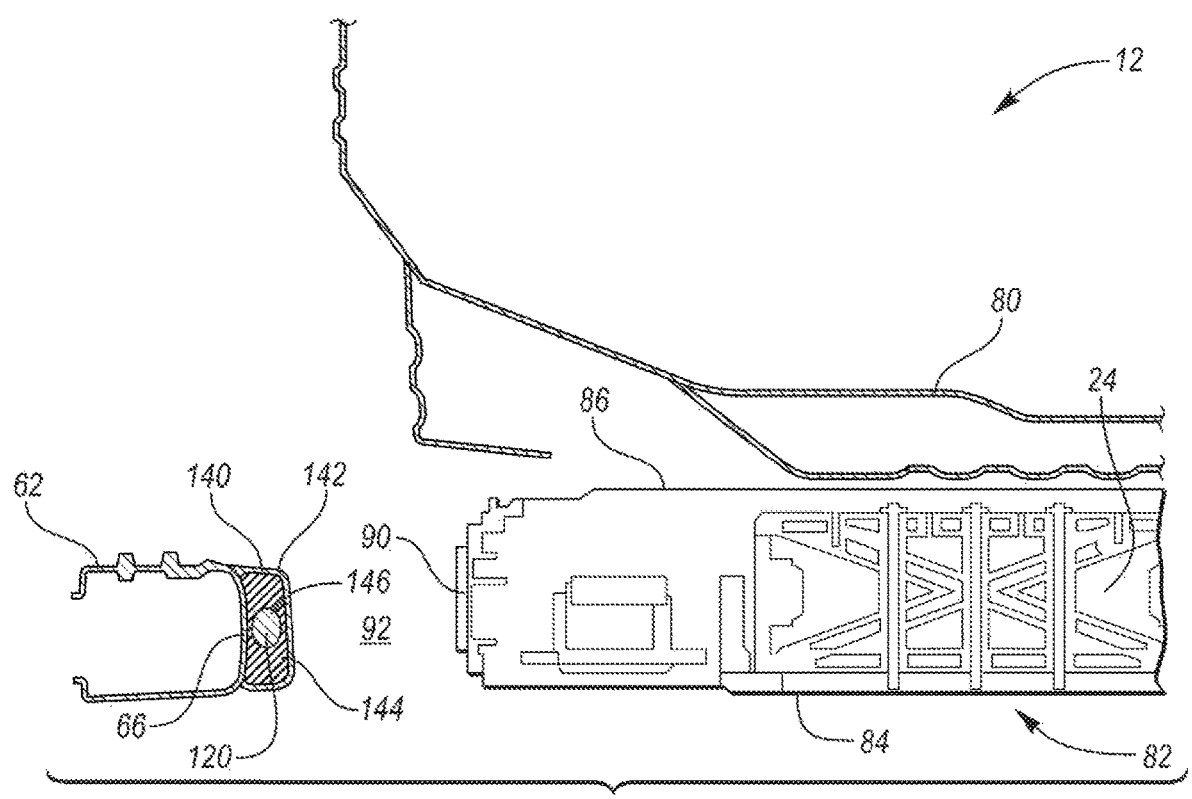
FIG. 4 is a side cross-sectional view of the vehicle chassis and the battery pack.
Figure 5:
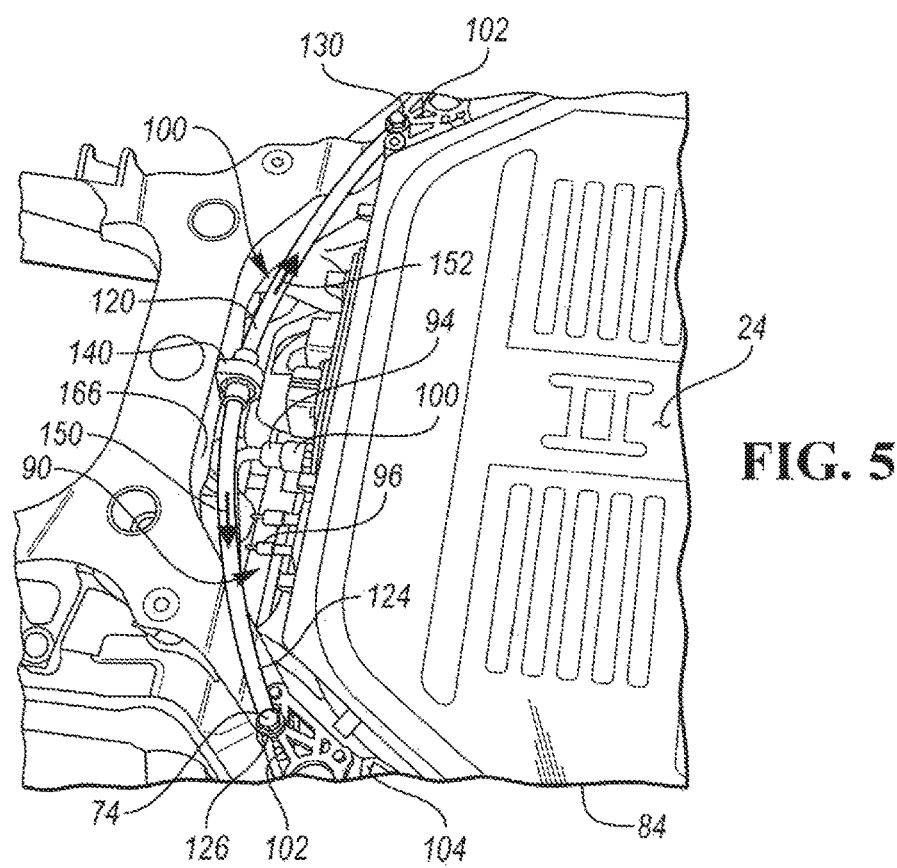
FIG. 5 is a perspective view of the vehicle chassis and the battery pack.

Referring to FIGS. 3, 4, and 5, the battery pack 24 is supported between the rockers 52 beneath a floor pan 80 of the vehicle 12. The battery pack 24 includes a support structure 82 that houses and supports the battery cells, the cooling system, the electronics, and other systems associated with the battery 24. The support structure 82 may include a tray 84 that forms the bottom of the battery pack 24, a pair of opposing siderails 88 that are generally disposed below the rockers 52, a front wall 90 that extends laterally between the siderails 88, and a cover 86 disposed adjacent to the floor 80. The front wall 90 is longitudinally spaced behind the rear side 66 of the cross member 62 creating a void space 92. At least one high-voltage wiring harnesses 94 and the coolant lines (not shown) may connect to the battery pack 24 at the front wall 90. The wiring harnesses 94 and the coolant lines may generally occupy the void space 92 without contacting the cradle 60. For example, the front wall 90 may include cooling ports 96 and electrical connectors 100. While shown as having both coolant and electrical connections, the front wall may only have one of these connections, or alternatively none.

Referring to FIGS. 2 and 5, the battery cells, the electronics, and/or other relatively fragile components are disposed within the support structure 82, which provides protection from the elements and from impacts such as normal road vibrations as well as collisions. Some portions of the support structure 82 are designed to receive energy during a collision whereas other elements are not and should be protected. For example, the siderails 88 are designed to receive impact energy during a collision without seriously damaging the internal components of the battery pack 24. The siderails 88 are attached to the rockers 52, such as by fasteners, and may also aid in the stiffness of the vehicle chassis 50. The front cradle 60 may be connected to the siderails 88 either directly or indirectly via one or more intermediary members. In the illustrated embodiment, the second ends 70 of the arms 64 are attached to the siderails 88, by brackets 102 and 104. This connection forms load paths 106, 108 through the arms 64, through the brackets 102, 104, into the siderails 88 and subsequently into the rockers 52. These load paths 106, 108 travel outwardly away from the fragile components of the battery pack 24 to avoid damaging the battery cells and the like. The load paths 106, 108 may receive collision energy from the front cradle 60 in the event of a front collision.

The front wall 90, unlike the siderails 88, is not designed to receive collision energy from the front cradle 60. The front wall 90 may contain fragile components within the wall itself, e.g., electrical connections, as well as directly behind it. Impact of the cross member 62 into the front wall 90 has a high potential for damaging the battery pack 24. The load paths 106 and 108 resist rearward displacement of the front cradle 60 to prevent impact between the cross member 62 and the front wall 90. A cradle-reinforcement brace 120 may be used to further mitigate the possibility of impact between the cross member 62 and the battery pack 24. The brace 120 is generally disposed within the void space 92 and is spaced apart from the front wall 90. The front wall 90 is free of structural attachments with the chassis 50 to mitigate collision energy from damaging the relative fragile components mounted near or on the front wall 90.

Referring to FIGS. 2, 4, and 5, the brace 120 may include a midpoint 122 that is connected to the cross member 62, a first segment 124 having an end 126 connected to one of the siderails 88, and a second segment 128 having an end 130 connected to the other of the siderails 88. The brace 120 may be connected to the siderails 88 either directly or indirectly via one or more intermediary components. In the illustrated embodiment, the brace 120 is connected to the siderails 88 via the brackets 102 and 104. The brace 120 may be attached to the second ends 70 of the arms 64 via the fasteners 74. The brace 120 is also attached to the chassis 50 via fasteners 74

The brace 120 is an elongate member having an arch-like shape. The brace 120 may be formed of metal such as steel. The brace 120 may be tubular with a hollow center. Alternatively, the brace 120 may be a solid rod. The brace 120 may have a circular cross section, ovular cross section, rectangular cross-section, or other shape.

The brace 120 is attached to the cross member 62 with an isolator so that vibrations are not transferred between the front cradle 60 and the brace 120. The vibrations can cause unwanted noise and other undesirable conditions. In one embodiment, a bushing assembly 140 attaches the brace 120 to the front cradle 60. The bushing assembly 140 may include a bracket 142 that is attached to the rear side 66 of the cross member 62. A bushing 144 is supported within the bracket 142. The bushing 144 defines an opening 146 configured to receive the midpoint 122 of the brace 120. The bushing 144 not only absorbs vibrations to provide a damper between the front cradle 60 and the brace 120 but also allows the brace 122 rotate within the opening 146.

The brace 120 supplements the load paths to resist rearward displacement of the front cradle 60 towards front wall 90 during a front collision. The arched shape of the brace 120 helps to distribute all types of frontloading (e.g., offset full overlap, oblique, or angular) and redirects these loads outboard towards the rockers 52 and away from the battery pack 24. The first and second segments 124, 126 of the brace 120 creative pair of load paths 150, 152 between the cross member 62 and the siderails 88, chassis 50. The first load path 150 extends between the bushing assembly 140 and the first end 126 of the brace, and the second load path 152 extends between the bushing assembly 140 and the second end 128 of the brace. The load paths 150, 152 of the brace 120 tie-in with the load paths 106, 108 at the brackets 102, 104 to transfer collision energy to the rockers 52.

The front cradle 60 has a step-up design allowing the brace 120 to be generally in the same plane as the battery pack 24. This reduces the risk of bending during a front impact event. As best shown in FIG. 3, the arms 64 extend downwardly from the ends 70 so that the cross member 62 is generally in the same plane as the battery pack 24. This places the brace 120 generally in the same plane as the battery pack 24, which make most efficient use of the arch shape of the brace 120.

The load paths 106 and 108 work in tandem with the load paths 150, 152 of the brace 120 to divert collision energy around the battery pack 24 and into the siderails 88 and the rockers 52 as well as reduce the likelihood of impact between the front cradle 60 and the front wall 90 to mitigate damage to the battery pack 24 during a front collision. Mitigating damage to the battery pack 24 reduces repair costs associated with the vehicle, increases safety, and reduces possible environmental contamination.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery pack including siderails;
   a front cradle including rearwardly extending arms connected to the siderails, a cross member longitudinally spaced from the battery pack, and a bushing assembly; and
   a brace including a midportion connected to the cross member and ends connected to the arms such that the brace creates load paths between the cross member and the siderails to inhibit impact between the cross member and the battery pack, wherein the brace is attached to the cross member via the bushing assembly.

2. The vehicle of claim 1, wherein the bushing assembly has a bushing defining an opening and a bracket attaching the bushing to a rear side of the cross member, and the brace is received in the opening such that the brace is rotatable within the bushing.

3. The vehicle of claim 1, wherein the battery pack includes a front wall having at least one of an electrical connection and a coolant port, and wherein the brace inhibits impact between the cross member and the front wall.

4. The vehicle of claim 3, wherein the brace is spaced apart from the front wall so that the front wall is free of structural attachment.

5. The vehicle of claim 1, wherein the brace is not directly connected to the battery pack.

6. The vehicle of claim 1 further comprising a vehicle body including longitudinal rockers, wherein the battery pack is supported between the rockers with the siderails being connected to the rockers.

7. The vehicle of claim 1, wherein the arms are connected to the siderails via one or more intermediate components.

8. The vehicle of claim 1, wherein the brace is an elongate member.

9. The vehicle of claim 8, wherein the brace is shaped as an arch.

10. The vehicle of claim 8, wherein the elongate member is tubular.

11. The vehicle of claim 1, wherein the brace is steel.

12. A vehicle comprising:
- a chassis including spaced apart longitudinal rockers;
- a front cradle including a cross member, arms extending rearwardly and outwardly from the cross member and a bushing assembly, wherein each of the arms are connected to the chassis;
- a battery pack supported to the chassis between the rockers, the battery pack including:
  - a support structure having a tray, a front wall, and opposing siderails connected to the rockers, and
  - battery cells supported on the tray and disposed between the siderails and behind the front wall; and
- a brace including a midportion connected to the cross member and ends connected to the chassis, the brace being longitudinally spaced from the front wall so that the brace and the front wall are not attached, wherein the brace creates load paths between the cross member and the chassis that route collision energy around the battery pack and inhibit impact between the cross member and the front wall, wherein the brace is attached to the cross member via the bushing assembly.

13. The vehicle of claim 12, wherein the brace is an elongate member.

14. The vehicle of claim 13, wherein the elongate member is tubular.

15. The vehicle of claim 12, wherein the brace is shaped as an arch.

16. The vehicle of claim 12, wherein the bushing assembly has a bushing defining an opening and a bracket attaching the bushing to a rear side of the cross member, and the brace is received in the opening such that the brace is rotatable within the bushing.

17. A vehicle comprising:
- rockers;
- a battery pack supported between the rockers;
- a front cradle including arms connected to the rockers and a cross member longitudinally spaced from the battery pack; and
- an arched brace including a midportion attached to the cross member and ends connected to the rockers such that the brace creates load paths between the cross member and the rockers to route energy around the battery pack mitigating damage during a collision, wherein the front cradle further includes a bushing assembly, and the brace is attached to the cross member via the bushing assembly.

18. The vehicle of claim 17, wherein the brace is an elongate member.

19. The vehicle of claim 17, wherein the brace is an elongate member.

20. The vehicle of claim 17, wherein the bushing assembly has a bushing defining an opening and a bracket attaching the bushing to a rear side of the cross member, and the brace is received in the opening such that the brace is rotatable within the bushing.

\* \* \* \* \*